June 1, 1965
J. G. HUNDLEY
3,187,038
CONTINUOUS OXIDATION PROCESS FOR PRODUCTION OF BENZOIC ACID
Filed Jan. 9, 1961
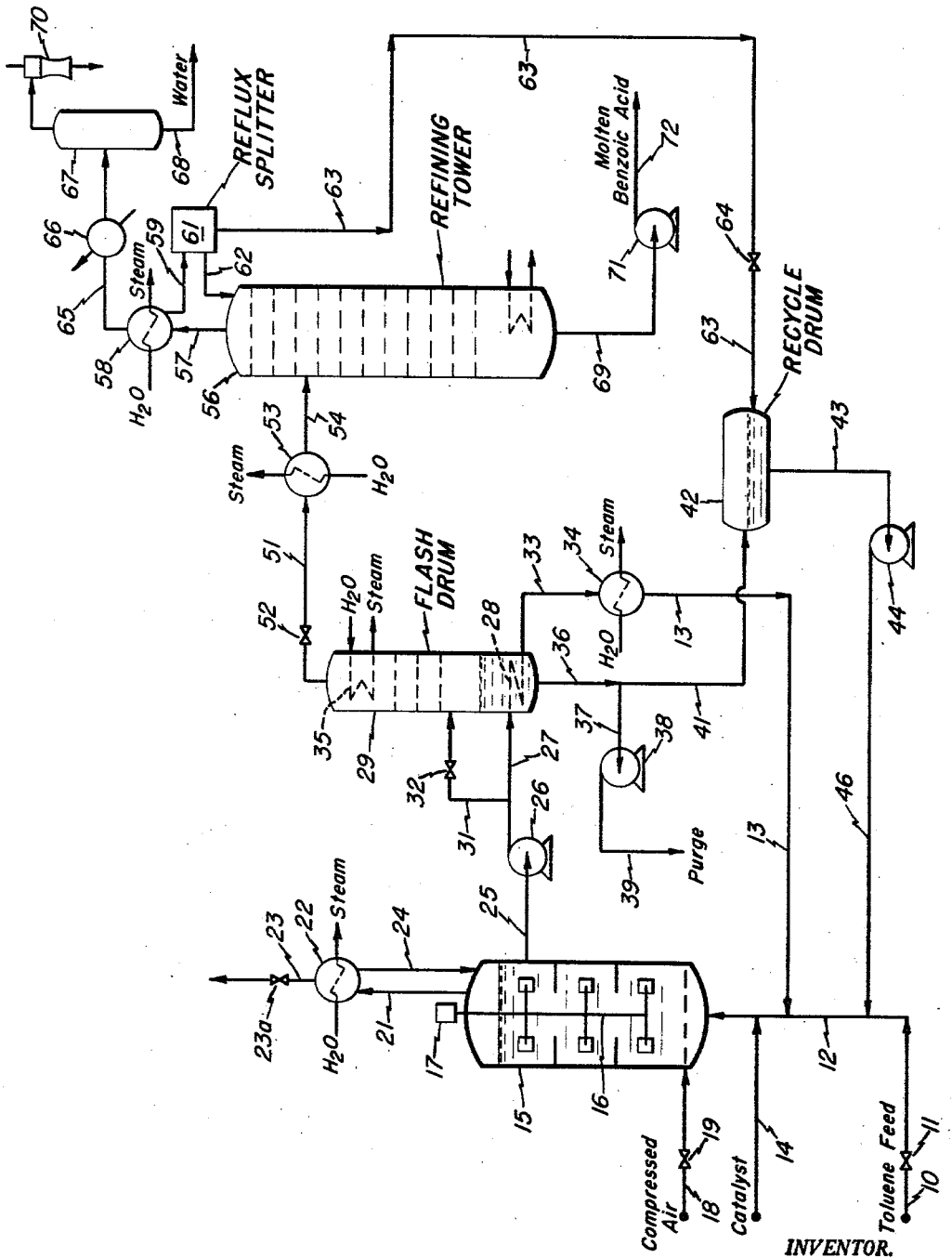
INVENTOR.
John G. Hundley
BY
*Samuel Kahn*
ATTORNEY United States Patent Office 3,187,038
Patented June 1, 1965

3,187,038
CONTINUOUS OXIDATION PROCESS FOR PRODUCTION OF BENZOIC ACID
John G. Hundley, Munster, Ind., assignor to Standard Oil Company, Chicago, Ill., a corporation of Indiana
Filed Jan. 9, 1961, Ser. No. 81,559
2 Claims. (Cl. 260—524)

This invention relates to an improved process for the preparation of benzoic acid. More particularly, the invention is concerned with an integrated, continuous process for the conversion of toluene to benzoic acid by catalytic liquid phase air oxidation in the presence of metal oxidation catalysts, and with means for effecting efficient recovery of high purity benzoic acid suitable for commercial applications.

Heretofore it has been known to produce benzoic acid by the oxidation of toluene with an oxygen-containing gas in the presence of a heavy metal oxidation catalyst, for example cobalt and/or manganese salts. Such oxidations, whether effected batchwise or by continuous processes, have generally been effected in the presence of a reaction solvent or medium, such as a lower saturated aliphatic carboxylic acid or in the presence of an excess of reactant, namely, toluene, which serves as reaction medium diluent, as well as feedstock in the oxidation process. It has hitherto been proposed that benzoic acid, which is itself the desired product of reaction, be employed as a reaction medium for effecting toluene oxidation to benzoic acid.

The object of this invention is to provide an improved commercial oxidation system which is particularly suitable for the conversion of toluene to benzoic acid and which employs benzoic acid as a reaction medium. A further object is to provide a novel continuous oxidation system which will result in the attainment of product quality and yields comparable or even superior to those attainable by batch processes. A further object is to provide an integrated system for separating benzoic acid from a recycle stream comprising benzoic acid, catalyst and associated impurities most effectively. These and other objects will be apparent as the detailed description of the invention proceeds.

In practicing the invention, fresh toluene charging stock is introduced into the lower part of a continuous oxidation reactor which contains a large body of benzoic acid reaction medium. An important aspect of the invention is the control of the concentration of toluene in the reactor below about 5% and preferably below about 2% by weight based on the benzoic acid employed as reaction medium. In order to maintain this low concentration of toluene, the reaction mixture consisting primarily of benzoic acid is withdrawn continuously from the top of the reactor and recycled continuously to the bottom thereof, means being provided for the continuous separation of a slip stream of benzoic acid from the recycle stream. The oxygen-containing gas, usually air, is introduced into the bottom of the continuous reactor in an amount and at a rate adjusted so as to give substantially complete conversion of the charged toluene to oxidation products, mainly benzoic acid. Catalyst employed in the reaction is charged and/or replenished by addition thereof to the continuous recycle loop of benzoic acid reaction medium. The mixture of toluene and benzoic acid in the oxidation reactor contains at least 85%, and preferably over 90 weight percent benzoic acid.

The oxidation of the toluene feedstock is effected in the presence of a heavy metal oxidation catalyst and advantageously in the presence of a catalyst consisting of a heavy metal oxidation catalyst and a bromide affording substance as a promoter. No novelty is claimed per se in the catalyst or in the catalyst promoter employed in this invention since the invention is an improvement in a toluene oxidation system recently perfected by others. The catalyst is a multivalent or heavy metal, preferably in a form which is soluble in the reaction medium or solvent. The catalyst metal may advantageously be selected from the group consisting of manganese, cobalt, nickel, chromium, vanadium, molybdenum, tungsten, tin, cerium or mixtures thereof, and the metal may be employed in elemental, combined or ionic form, preferably as a compound soluble in the reaction medium. The promoter, if used, is a bromine-affording substance, the bromine being in elemental, ionic or inorganic form. Thus, the bromine may be employed in the form of potassium bromate, ammonium bromide, benzyl bromide, tetrabromoethane, manganese bromide or the like. The proportions of catalyst and promoter may be approximately stoichiometric as examplified by manganese bromide and generally are in the range of 1:10 to 10:1 atoms of catalyst metal per atom of bromine. The amount of heavy metal catalyst employed is usually in the range of about .01 to 10% or more and is preferably in the range of about .2 to 2% by weight based on the reactor charge. The preferred mixed metal catalysts are mixtures of manganese in the form of bromide or acetate with ammonium molybdate, ammonium chromate, tungstic acid, cobalt acetate, or the like, the proportions usually being about 1 to 2 parts by weight of the manganese salt per part by weight of the other metal compound. Alternatively, of course, the catalyst metals may be employed as salts of an acid which is being produced in the system.

The oxidation reaction is effected continuously at an elevated temperature, e.g. in the range of about 300–450° F., preferably 400–425° F., and elevated pressure, for example 100–500 p.s.i.g., preferably about 300 p.s.i.g. The oxidation of toluene under these conditions is a highly exothermic reaction, and an important aspect of the process is the conduct of the continuous oxidation process under essentially adiabatic conditions. The temperature of reaction is controlled by continuous recycle of an externally cooled recycle stream of benzoic acid, heat removal external to the oxidation reactor being effected by indirect heat exchange of the recycle benzoic acid with process water. By this means, process steam is produced which can be employed to effect a substantial savings in overall economy in plant operation. In operation of the process, the recycle stream of benzoic acid is cooled to a temperature sufficient to provide a recycle stream of benzoic acid, together with charged toluene reactant, of about 300–350° F.

The total product from the oxidation reactor is withdrawn and passed to a flash chamber or tower operated at 375–400° F. and sub-atmospheric pressure. In a preferred embodiment of the invention, a major portion of the oxidation reactor effluent is passed through a coil or conduit in the flash chamber, a minor portion of the reactor effluent being introduced into the flash chamber in indirect heat exchange relation with the major body of recycle benzoic acid. Benzoic acid accompanied by small amounts of connate impurities more volatile than benzoic acid, e.g. benzyl bromide, benzoyl bromide (where a bromine compound is used as a catalyst component), benzyl alcohol, benzaldehyde and water is continuously flashed off in the flash chamber to suitable recovery means hereinafter described for recovery of the benzoic acid produced. By flashing only a portion of the reactor effluent, a flash chamber residue is obtained having a substantially higher concentration of catalyst and associated impurities, which residue can then be partially discarded as a purge from the reaction system. Make-up catalyst to compensate for catalyst continuously removed with the purge stream is introduced together with fresh toluene reactant to the recycle benzoic acid loop.

In a preferred embodiment of the invention, benzoic acid vapors which are obtained from the flash chamber are introduced into a reflux tower provided with a hot condenser and operated at a bottom temperature of 350–400° F. and pressure of 1.5–5.0 p.s.i.a. The benzoic acid stream is introduced at an intermediate point in the reflux tower, a minor proportion of benzoic acid and light impurities being recovered for recycle to the reactor, water contained in the benzoic acid being removed overhead as vapor. Bottoms from the reflux tower consisting of pure molten benzoic acid are withdrawn as a product liquid stream and subsequently subjected to further purification, if desired, or cooled, flaked and bagged as pure product.

Further objects and aspects of the invention will be apparent from the following detailed description of a specific example thereof read in conjunction with the accompanying drawing which forms a part of the specification.

This invention will be described as applied to the conversion of about 4000 pounds per hour of toluene charging stock to about 5300 pounds per hour of benzoic acid. Referring to the drawing, toluene obtained from storage, not shown, enters through line 10 controlled by valve 11 and is mixed in line 12 with recycle benzoic acid entering through line 13 and make-up oxidation catalyst entering through line 14. The catalyst is preferably a cobalt or manganese salt, as for example the benzoate, oleate, or other carboxylic acid salt of one or both of these metals and optionally a bromine supplying substance, e.g. ammonium bromide, tetrabromoethane, etc. The amount of catalyst added via line 14 is controlled so as to maintain a metal content based on total charge to the oxidizer, between about 0.01 and 10 weight percent preferably between 0.2 to 2%. In this specific example, manganese acetate and ammonium bromide are employed as catalysts, in an amount such that the manganese acetate concentration in the reactor is 0.5 weight percent and the ammonium bromide content is 0.25 weight percent.

The feed mixture entering through line 12 is passed into the oxidizing vessel 15 which may be a pressure resistant vessel made of or lined with stainless steel or other acid resistant material, optionally divided into a plurality of zones by baffles and provided with stirring device 16 operated by motor 17. Oxygen, air, or other oxygen-containing gas is introduced into the oxidation vessel through line 18 controlled by valve 19. In this example, air at a rate of 362 moles/hour provides satisfactory conversion of substantially all of the toluene charged to oxidation products, mainly benzoic acid. Spent gases are vented by line 21 through knock-back condenser 22 which is maintained at a temperature of about 300° F.; water vapor and uncondensibles being vented via line 23, while entrained benzoic acid and condensibles are returned via line 24 to the oxidizer. The pressure in the oxidizer is controlled by means of valve 23a which permits regulation of the rate of flow of spent gases and water vapor. Oxygen introduced to the reactor is controlled so as to provide a maximum oxygen concentration in condenser 22 and vent line 23 of less than 8%, preferably below about 2% to avoid explosion hazards.

Reactor 15 is initially charged with benzoic acid, heated to a temperature of about 430° F. and pressured with an inert gas, e.g. nitrogen, to about 300 p.s.i.g. Alternatively, toluene may be charged to the reactor, together with the required quantity of catalyst, and the toluene converted to benzoic acid by air oxidation prior to continuous onstream operation of the oxidation system. During continuous operation, reactor pressure is maintained at about 300 p.s.i.g., in this example 315 p.s.i.g., and recycle banzoic acid containing connate impurities, together with fresh toluene feed, are introduced to the reactor through line 12 at a temperature of 340° F. Heat of reaction results in an increase in temperature in the reactor, and liquid effluent continuously removed from the upper part of the reactor is at a temperature of about 430° F. Charged toluene is converted substantially completely to benzoic acid; minor amounts of water, light impurities (e.g. benzyl alcohol, benzaldehyde, benzyl bromide and the like) and heavy impurities (e.g. benzyl benzoate, biphenyl, benzoic anhydride and the like) being concomitantly formed. Water in an amount of 720 pounds/hour is removed via line 23 with the reactor exit gases, containing in this example 0.5% oxygen and 2.0% carbon dioxide.

During continuous operation, reactor effluent is continuously removed via line 25 by means of pump 26, from which the reactor effluent is divided into two streams, a major portion passing by line 27 to closed coil 28 located within flash drum 29. A minor portion of the effluent is withdrawn via line 31 controlled by valve 32 and introduced directly into flash drum 29. In this example, valve 32 is adjusted to provide a flow of about 98 volume percent of the reactor effluent through coil 28, the remainder or about 2% of the reactor charge being passed directly to the flash drum as shown in the accompanying figure.

Considering the recycle benzoic acid stream first, effluent from coil 28 consisting in this example of about 212,750 pounds per hour of benzoic acid together with about 5000 pounds of water and 11,200 pounds of connate impurities as hereinbefore described passes via line 33 to heat exchanger 34 wherein the recycle stream is indirectly contacted with process water for the production of steam. The temperature of the recycle stream is reduced to about 340 to 350° F. by control of the water flow and/or steam exit pressure in heat exchanger 34. Recycle benzoic acid containing connate impurities then passes by line 13 to 12 for recharging to the reactor.

In vessel 29, which may be a conventional flash drum or preferably a flash tower provided with several fractionating trays, the defined conditions effect separation of a benzoic acid-rich vapor stream containing a minor amount of volatile impurities. Flash tower 29 may be provided, as shown in the accompanying figure, with an overhead partial condenser or coil 35 to provide a reflux ratio of about 1:10 in the tower. In this case, there is maintained a liquid level in flash tower 29 at a temperature of 380° F. and a pressure of about 2.3 p.s.i.a. to provide a bottoms recycle stream, removed from the flash tower 29 via line 36, of 1920 pounds per hour of benzoic acid and about 340 pounds of oxidation products other than benzoic acid. About 3–5% of this bottoms recycle stream is continuously removed by line 37 and pump 38 and discharged to waste via line 39. The remainder of the bottoms recycle stream passes by valved line 41 to recycle drum 42 which may be a conventional holding vessel, jacketed and heated to maintain the benzoic acid in molten condition. Pump 44 is provided to recycle material removed by line 43 from drum 42, via line 46 to line 12 for return to the oxidation reactor.

Returning now to flash tower 29, the slipstream of reactor effluent introduced via line 31 provides an overhead vapor stream consisting in this example, of 6133 pounds per hour of benzoic acid together with 184 pounds per hour of water and about 85 pounds per hour of volatile impurities. This vapor stream passes by line 51 controlled by valve 52 to hot condenser 53 and thence by line 54 to refining tower 56. Condenser 53 is not essential to the operation of the described process, but can be employed to effect partial condensation of the vapor stream from flash tower 29 and thus reduce the number of trays required in the lower portion of refining tower 56. In this example, refining tower 56 comprises a conventional distillation column provided with a reboiler, and is operated at a bottom temperature of 384° F. under vacuum provided by steam ejector 70 at a pressure of 2.0–3.0 p.s.i.a. Vapors from the refining tower pass by line 57 to overhead hot condenser 58 which is operated at a temperature of 260-280° F., providing a reflux stream of benzoic acid and light impurities which is returned by line 59 to reflux splitter 61. A major portion of the reflux stream is returned by line 62 to the upper part of the tower 56, while the remainder (about 10%) is returned by line 63 controlled by valve 64 to recycle drum 42. During continuous operation, refining tower 56 is operated at a reflux ratio of about 10:1, providing an overhead water vapor stream of 184 pounds per hour removed by line 65, condensed and discharged to waste via condenser 66, drum 67, and line 68. Molten benzoic acid free of water and impurities continuously accumulates at the bottom of tower 56 from which the product is removed via line 69 by pump 71 to product line 72. Product benzoic acid is obtained at a rate of 5370 pounds per hour, of high purity suitable for most commercial applications. If desired, the benzoic acid product can be subjected to additional purification, e.g. to distillation or crystallization from water or other solvent to provide an extremely pure benzoic acid product.

While the foregoing example has been described in considerable detail with respect to various operating conditions for the production of benzoic acid by continuous oxidation of toluene, it will be understood that various alternative operating techniques, steps and conditions as will be apparent from the foregoing description to those skilled in the art may be employed without departing from the scope of the invention as hereinafter claimed.

I claim:

1. A continuous process for the production of benzoic acid from toluene, which comprises in combination the steps of introducing into a liquid phase of benzoic acid having heavy metal oxidation catalyst dissolved therein in an oxidation zone liquid charging stock comprising essentially at least 85 weight percent benzoic acid and a finite amount, up to about 5 weight percent, of toluene, contacting said charging stock in the presence of heavy metal oxidation catalyst dissolved in said charging stock with molecular oxygen introduced into the bottom of said liquid phase in said oxidation zone in an amount sufficient to effect substantially complete oxidation of toluene in said zone, operating said zone under essentially adiabatic conditions at pressures in the range of about 100 to about 500 p.s.i.g. and temperatures in the range of 300° to 450° F., continuously withdrawing from said oxidation zone liquid effluent essentially free of toluene, separating at the pressure range in said zone said effluent into a liquid recycle stream and a liquid minor stream, said recycle stream being greater in weight than said minor stream, introducing said minor stream into a flashing zone operated at subatmospheric pressure and at 375 to 400° F., contacting within said flashing zone said minor stream in indirect heat exchange relationship with said recycle stream simultaneously thereby effecting partial cooling thereof and vaporizing a portion of said minor stream, thereafter further cooling said recycle stream to a temperature in the range of from 300 to 350° F., pumping a portion of the cooled recycle stream into said oxidation zone, removing from said flashing zone a benzoic acid rich portion said minor stream also having materials more volatile than benzoic acid and leaving a liquid bottoms stream and heavy metal oxidation catalyst dissolved therein together with materials less volatile than benzoic acid, pumping said liquid bottoms stream into said oxidation zone, charging said benzoic acid rich portion removed as vapors from said flashing zone to a distillation zone operated at 1.5 to 5.0 p.s.i.a. and a bottoms temperature of 350 to 400° F. to provide as an overhead fraction the materials more volatile than benzoic acid and liquid product benzoic acid as a distillation bottoms fraction, and continuously recovering the liquid product benzoic acid distillation bottoms fraction.

2. In a continuous process for the production of benzoic acid from toluene wherein a charging stock consisting essentially of at least 85 weight percent benzoic acid and a finite amount, up to about 5 weight percent, of toluene is oxidized in the presence of heavy metal oxidation catalyst with molecular oxygen at a pressure in the range of from about 100 to about 500 p.s.i.g. and a temperature in the range of from about 300 to 450° F. under essentially adiabatic conditions in an oxidation zone and wherein liquid effluent essentially free of toluene is continuously withdrawn at the pressure in said oxidation zone from said oxidation zone, the improvement of separating said effluent at said pressure into a liquid recycle stream and a liquid minor stream, said recycle stream being greater in weight than said minor stream, introducing said minor stream into a flashing zone operated at subatmospheric pressure and at a temperature of 375 to 400° F. and contacting said minor stream in said flashing zone in indirect heat exchange with said recycle stream whereby simultaneously a benzoic acid rich vapor mixture also having materials more volatile than benzoic acid is formed and said recycle stream is partially cooled, thereafter further cooling said recycle stream to a temperature in the range of 300 to 350° F. by the generation of steam from water and pumping a portion of the cooled recycle stream into said oxidation zone, removing said benzoic acid rich vapor mixture from said flashing zone leaving a liquid bottoms stream having dissolved therein a portion of the heavy metal oxidation catalyst and material less volatile than benzoic acid and charging said benzoic acid rich materials into a distillation zone operated at 1.5 to 5.0 p.s.i.a. and 350 to 400° F. to provide an overhead fraction consisting of materials more volatile than benzoic acid and a liquid product benzoic acid bottoms fraction which is continuously withdrawn from the distillation zone.

References Cited by the Examiner

UNITED STATES PATENTS

| Re. 22,775 | 6/43 | Potts | 202—53 |
|---|---|---|---|
| 1,686,913 | 10/28 | Jaeger | 260—525 |
| 1,694,124 | 12/28 | Jaeger | 260—525 |
| 1,902,550 | 3/33 | Forrest et al. | 260—524 |
| 2,054,096 | 9/36 | Potts et al. | 202—53 |
| 2,152,164 | 3/39 | Wentworth | 202—53 X |
| 2,245,528 | 6/41 | Loder | 260—524 |
| 2,670,355 | 2/54 | Barsky et al. | 202—53 X |
| 2,696,499 | 12/54 | Himel | 260—524 |
| 2,712,550 | 7/55 | Cheney et al. | 260—524 |
| 2,734,080 | 2/56 | Aroyan et al. | 260—525 |
| 2,792,419 | 5/57 | Smith | 260—525 X |
| 2,833,816 | 5/58 | Saffer et al. | 260—524 |
| 2,894,985 | 7/59 | Grantham et al. | 260—524 X |
| 2,904,509 | 9/59 | Helmers | 202—53 X |
| 2,963,509 | 12/60 | Barker et al. | 260—524 |
| 3,011,955 | 12/61 | Brown | 202—53 |

FOREIGN PATENTS 833,440  4/60  Great Britain.

LORRAINE A. WEINBERGER,
*Acting Primary Examiner.*

LEON ZITVER, *Examiner.*